(12) United States Patent
Browne et al.

(10) Patent No.: US 12,480,436 B2
(45) Date of Patent: Nov. 25, 2025

(54) INTERNAL COMBUSTION ENGINE

(71) Applicant: JCB Research, Uttoxeter (GB)

(72) Inventors: Kevin Browne, Uttoxeter (GB); Paul McCarthy, Uttoxeter (GB)

(73) Assignee: JCB Research, Uttoxeter (GB)

( * ) Notice: Subject to any disclaimer, the term of this patent is extended or adjusted under 35 U.S.C. 154(b) by 487 days.

(21) Appl. No.: 17/955,527

(22) Filed: Sep. 28, 2022

(65) Prior Publication Data

US 2023/0100541 A1 Mar. 30, 2023

(30) Foreign Application Priority Data

Sep. 28, 2021 (GB) ...................................... 2113871

(51) Int. Cl.
*F02B 43/10* (2006.01)

(52) U.S. Cl.
CPC .......... *F02B 43/10* (2013.01); *F02B 2201/04* (2013.01)

(58) Field of Classification Search
CPC ........ F02B 43/10; F02B 2201/04; F02B 5/00; F02B 2043/106; Y02T 10/12; Y02T 10/30; F02M 61/14; F02M 21/0206; F02F 2001/245; F02F 1/242
See application file for complete search history.

(56) References Cited

U.S. PATENT DOCUMENTS

| | | |
|---|---|---|
| 3,903,849 A | 9/1975 | List et al. |
| 4,744,342 A | 5/1988 | Ochiai |
| 4,958,604 A | 9/1990 | Hashimoto |
| 5,429,086 A | 7/1995 | Glackin |
| 5,799,638 A | 9/1998 | Tsuchida et al. |
| 5,873,331 A * | 2/1999 | Jutz ....................... F02F 1/4214 123/193.5 |

(Continued)

FOREIGN PATENT DOCUMENTS

| | | | |
|---|---|---|---|
| AT | 326422 B | * 12/1975 | |
| CN | 102016275 A | * 4/2011 | ........... F02D 19/061 |
| DE | 1258654 B | * 1/1968 | |

(Continued)

OTHER PUBLICATIONS

Examination Report, European Application No. 22197298.7, dated Jul. 2, 2024.

(Continued)

*Primary Examiner* — Hung Q Nguyen
(74) *Attorney, Agent, or Firm* — MARSHALL, GERSTEIN & BORUN LLP

(57) ABSTRACT

An internal combustion engine for use with hydrogen fuel includes a cylinder assembly having a combustion chamber with a cylinder, a cylinder head, and a piston. Two inlet ports are disposed within the cylinder head, the inlet ports being closable by an inlet valve, and an outlet port within the cylinder head being selectively closable by an outlet valve. At least one spark plug is mounted to the cylinder head, and piston assembly having the piston and a crankshaft. A line passes through a center of one of the inlet ports and a center of a corresponding outlet port, with the line arranged at a non-zero angle to an axis of rotation of the crankshaft and with the line at a non-right angle to the axis of rotation. The cylinder head is secured by six fasteners, such as six bolts to an engine block defining the cylinder.

14 Claims, 15 Drawing Sheets

(56) References Cited

U.S. PATENT DOCUMENTS

2011/0083624 A1\* 4/2011 Megel ...................... F02F 1/40
123/193.5

FOREIGN PATENT DOCUMENTS

| | | | |
|---|---|---|---|
| DE | 40 11 292 A1 | 10/1990 | |
| EP | 0 603 924 A1 | 6/1994 | |
| EP | 2 017 454 A1 | 1/2009 | |
| EP | 2 940 268 A1 | 11/2015 | |
| GB | 2 365 071 A | 2/2002 | |
| GB | 2453411 A \* | 4/2009 | ............. F02B 17/00 |
| GB | 2553821 A | 3/2018 | |
| JP | 2004076679 A \* | 3/2004 | ........... F02D 19/061 |
| JP | 2015-063957 A | 4/2015 | |
| RU | 2697304 C2 \* | 8/2019 | .............. F02B 43/00 |

OTHER PUBLICATIONS

Extended European Search Report issued in EP 22197298.7, dated Mar. 14, 2023.
Search Report issued in GB 2113871.4, dated Nov. 3, 2021.

\* cited by examiner

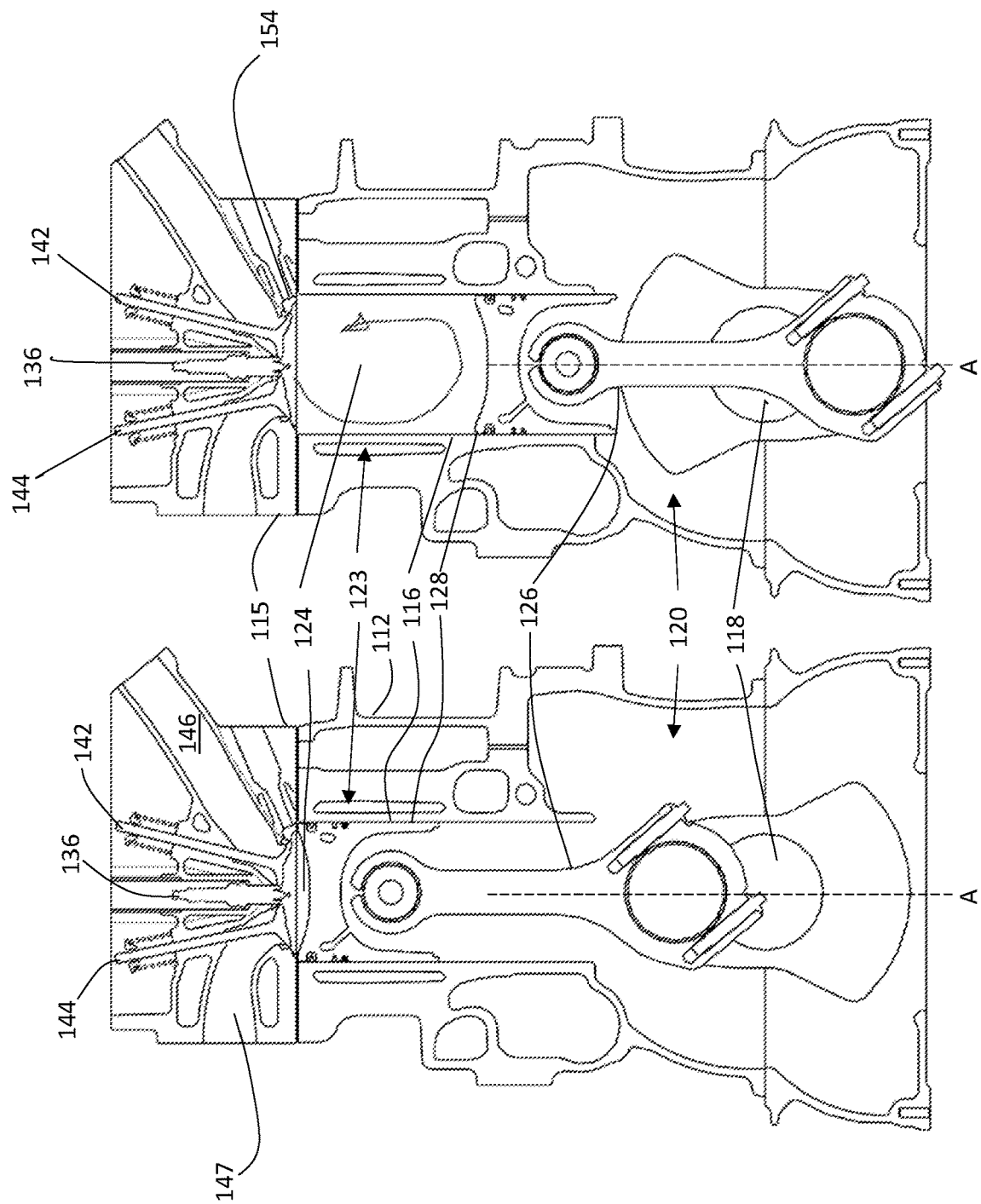

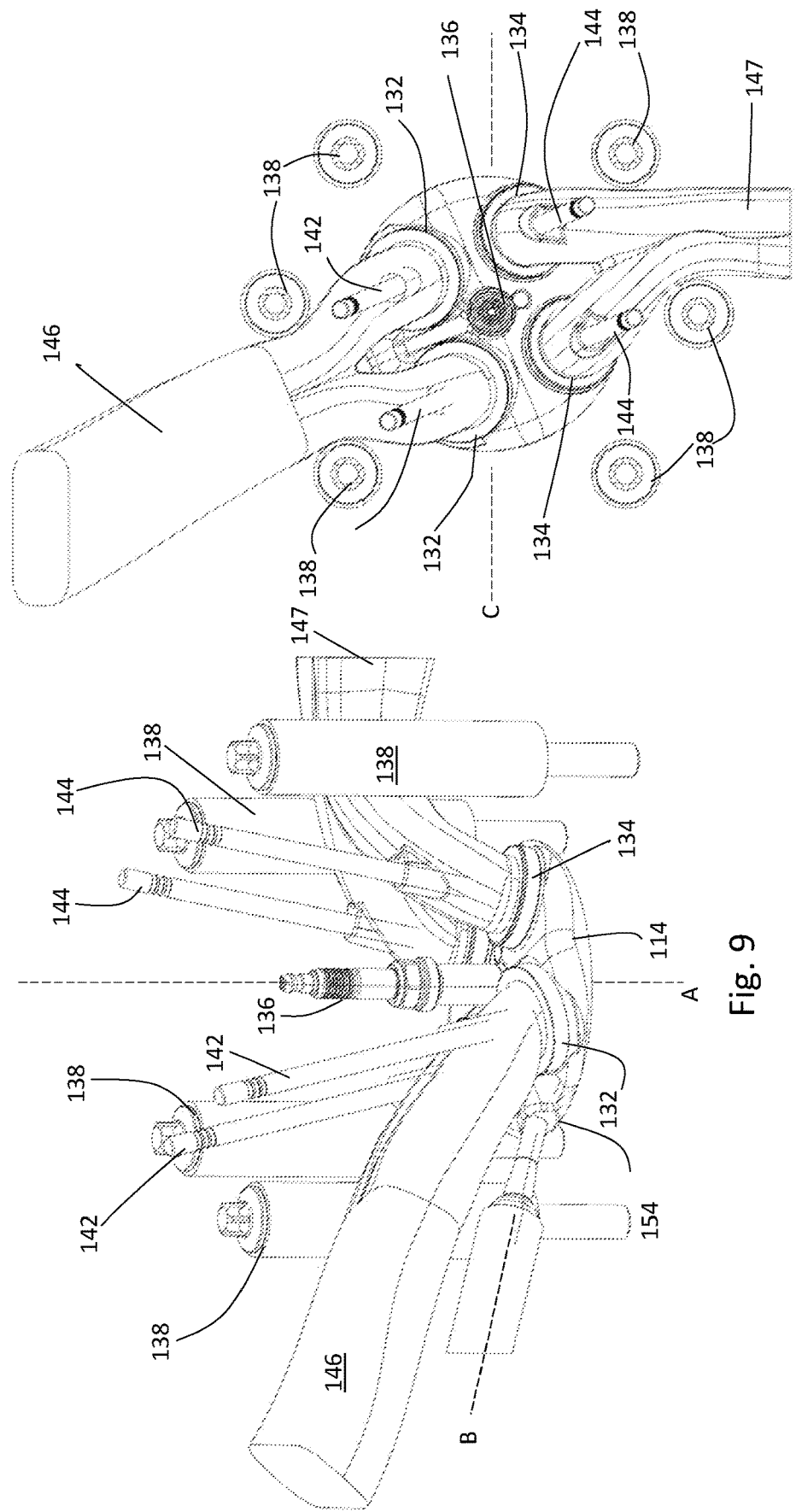

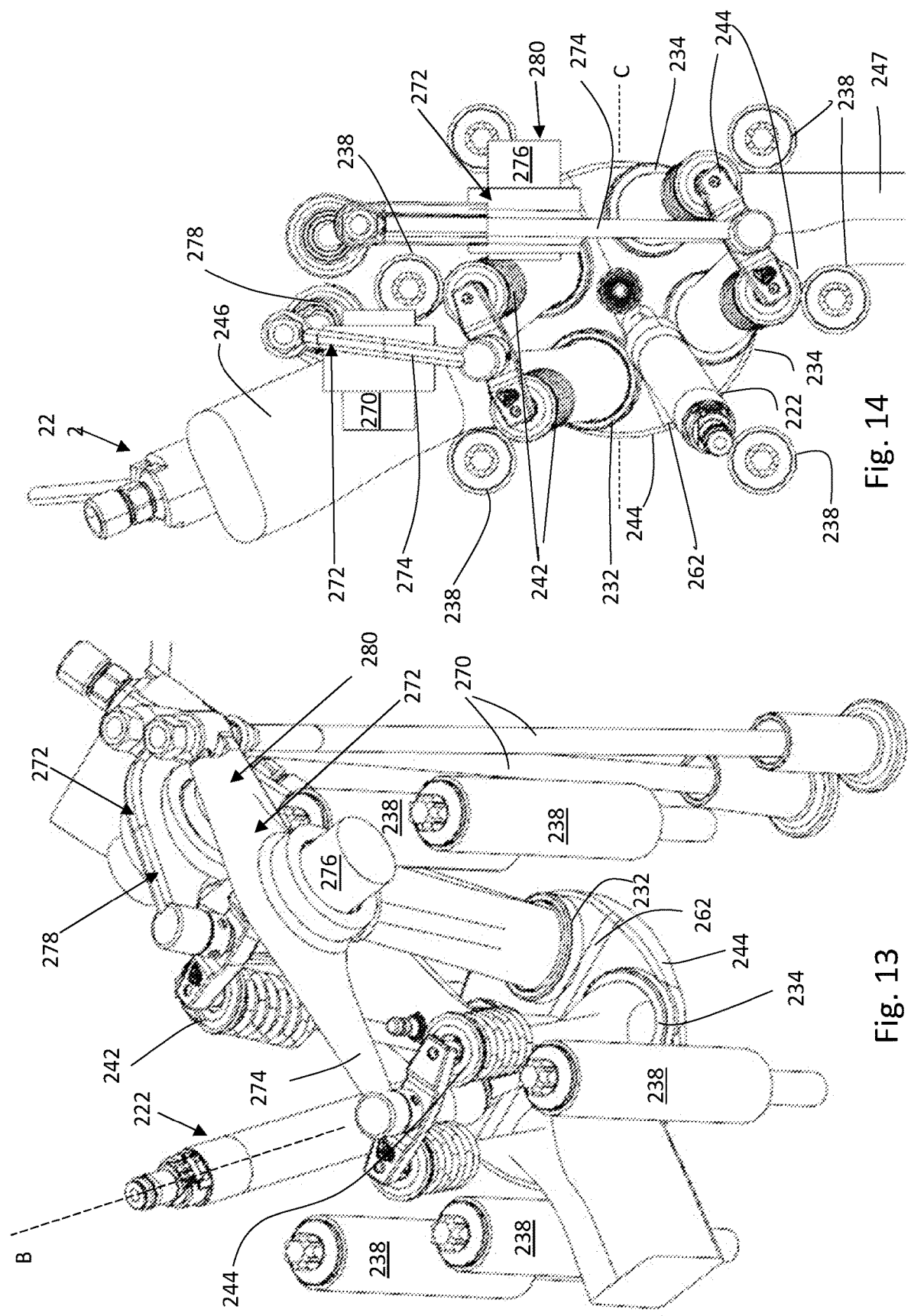

INTERNAL COMBUSTION ENGINE

FIELD

The present invention relates to an internal combustion engine suitable for use with a hydrogen-based fuel.

BACKGROUND

There is increasing concern relating to the contribution carbon dioxide emissions make to global warming and, as a way of minimizing such emissions, legislation is planned to ban or restrict internal combustion powered vehicles and machines that utilize fossil fuels. As a result, many industries are seeking alternative means for powering vehicles and machines that reduce or eliminate the use of fossil fuels such as gasoline (petrol) or diesel.

For light vehicles, such as passenger cars, batteries charged using electricity from renewable energy sources appears to be the favored approach. The duty cycles of light vehicles are less impaired by the reduced energy density of batteries and can accommodate the longer charging time as compared to traditional refuelling time of gasoline and diesel. In addition, the mass of the batteries needed to have a reasonable range does not appreciably restrict the ability of these vehicle to carry the required payload of people and their belongings.

However, heavy vehicles may operate for a full working day or over successive shifts with limited downtime, and may be required to carry a heavy payload over a significant distance, such as line haul/freight trucks, or carry out a working operation, such as construction or agricultural machinery. For these use cases, the low energy density, cost and recharging time of batteries means they represent a less attractive option because their required mass may restrict the available payload in the case of trucks and in all cases the cost and recharging time may make their use uneconomic and impractical.

Hydrogen based fuel has been proposed as a solution to these issues as it can be produced in a renewable manner, has a greater energy density than lithium ion batteries, and refuelling can be carried out as quickly as for gasoline and diesel. Commonly, fuel cells are proposed as a means of "cleanly" converting hydrogen to electricity on a vehicle. The electricity is used in powering electric motors for traction and/or to drive hydraulic pumps that in turn power working arms of working machines such as excavators, materials handlers or the like. However, fuel cells are currently expensive and fragile, so their implementation faces practical challenges.

It is also known to use hydrogen as a fuel in internal combustion engines. This is attractive as supply chains and maintenance expertise already exists for internal combustion engines, even though adaptation is required for them to run on hydrogen.

Difficulties arise in using of hydrogen as a fuel in a traditional diesel combustion engine for heavy machinery. Firstly, hydrogen fuel requires the use of a spark plug for ignition of the hydrogen, which diesel engines do not possess. Further diesel engines are configured to mix diesel fuel with air in a way that is optimized for high efficiency and low emissions with compression ignition. Gasoline internal combustion engines do comprise a spark plug and mix fuel and air in a way that is optimized for spark ignition. However, gasoline engines do not have characteristics required for operation of heavy machines, such as high torque outputs at a low rpm. Beyond this, it is also desirable for existing manufacturers of engines for heavy duty applications to be able carry over their existing engine designs with minimal adaptations for efficient combustion of hydrogen fuel.

The present invention seeks to overcome or at least mitigate the problems described above. However, that is not to say it is limited to these situations, and more generally seeks to provide an internal combustion engine suitable for use with a hydrogen-based fuel, regardless of its intended application.

SUMMARY

A first aspect of the teachings provides an internal combustion engine for use with hydrogen fuel, the engine having at least one cylinder assembly, each cylinder assembly comprising a combustion chamber comprising a cylinder, a cylinder head and a reciprocating piston assembly; two inlet ports within the cylinder head, the inlet ports being selectively closable by a corresponding inlet valve; at least one outlet port within the cylinder head, the at least one outlet port being selectively closable by a corresponding outlet valve; at least one spark plug mounted to the cylinder head; and a piston assembly comprising a piston and a crankshaft; further comprising a line passing through a center of one of the inlet ports and a center of a corresponding at least one outlet port; wherein the line is arranged at a non-zero angle to an axis of rotation of the crankshaft; wherein the line is at a non-right angle to the axis of rotation of the crankshaft; and further wherein the cylinder head is secured by six fasteners, such as six bolts to an engine block defining the cylinder.

The line being arranged at such a non-zero, non-right angle allows for the inlets to be routed around the other engine components. The angle also acts to generate "swirl" (rotation of the air-fuel mixture with the combustion chamber around an axis of the piston of the engine). This swirl provides better mixing resulting in a more even and efficient combustion. Six bolt heads are used for heavy duty diesel engines and such compression ignition engines utilize inlet ports that create a "swirl" motion about a vertical axis to mix the fuel and air, which provides for more efficient and cleaner compression ignition. By combining a heavy duty engine with swirl mixing it can be run efficiently with hydrogen spark ignition, whilst providing the required torque characteristics of heavy duty applications in construction and agricultural machinery, and in heavy goods vehicles.

Each cylinder assembly may further comprise an inlet runner bifurcating into a first section and a second section, the two sections each being connected to different inlet ports.

In this arrangement, the inlets can be routed around the other components surrounding the cylinder head, especially the six bolts. This arrangement also allows for other features to promote swirl and tumble.

The cylinder head may be substantially planar and substantially normal an axis of the piston.

In this arrangement, better tumble is produced by having a steeper angle of the inlet into the cylinder with respect to the longitudinal axis of the cylinder.

At least one of the first and second sections of the inlet runner may enter the corresponding inlet port at an angle greater than 32° with respect to a plane transverse an axis of the cylinder. The angle may be in the range of 32° to 36° and is preferably 36°.

In this arrangement the inlets are sufficiently angled to generate "tumble" (rotation of the air-fuel mixture with the combustion chamber around a horizontal axis of a crank shaft of the engine). This tumble provides better mixing resulting in a more even and efficient combustion, even in combination with a degree of swirl.

The first and second sections of the inlet runner may have non-equal lengths.

This arrangement further ensures an even and linear air flow to enhance the fuel-air mixture.

The angle between the line and the axis of rotation of the crankshaft may be in the range of 45° to 55° and is preferably 50°.

This range of angles provides for suitable mixing of hydrogen and air, whilst also allowing the components, in particular a fuel injector to be packaged with the required coolant galleries etc.

At least one of the valves may be located, when closed, in the corresponding port in a recessed position from an inner surface of the cylinder head.

This arrangement produces a better gas inflow/outflow and a reduction of soiling around the valve ports, leading to a more efficient and cleaner combustion cycle.

At least one of the inlet ports may have a larger diameter than the diameter of the at least one outlet port.

This arrangement produces a better gas inflow/outflow and a reduction of soiling around the valve ports, leading to a more efficient and cleaner combustion cycle.

Each cylinder assembly may further comprise a fuel injector arranged to inject hydrogen fuel through the cylinder head at an injection point. The fuel injector may be arranged so that the injection point is located intermediate one of the inlet ports and one of the at least one outlet ports, and optionally further arranged radially outward of a center of one of the inlet ports.

Optionally, the injector may be located adjacent a perimeter of the cylinder head.

The fuel injector may be arranged such that a longitudinal axis of the fuel injector is at an angle in the range of 3° to 8° with respect to a first vertical plane and 11° to 21° with respect to a second vertical plane normal to the first vertical plane, preferably at angles of 3° and 16° respectively to these planes.

These angles provide for suitable targeting of the fuel into the air, whilst allowing for packaging of the injector around coolant galleries and the cylinder head bolts.

The fuel injector may be arranged so that the injection point is located intermediate the two inlet ports Each cylinder assembly may further comprise an inlet runner, wherein a body of the fuel injector is arranged between the cylinder head and a lower wall of the inlet runner.

This arrangement allows for better routing of the components surrounding the cylinder head can be achieved, as well as a more optimal fuel injection for better mixing.

The cylinder head may comprise two outlet ports and the spark plug is located in a region intermediate the inlet and outlet ports, optionally the spark plug being located substantially at a center of the cylinder, optionally the spark plug being a M14 spark plug.

A central location optimizes combustion and use of an M14 spark plug enhances the durability of the spark plug.

The fuel injector may be arranged so that the injection point is located in a region intermediate the inlet and outlet ports, optionally the injection point being located proximate a center of the cylinder.

The cylinder head may further comprise two outlet ports and each inlet port may have a center and each outlet port has a center and the centers of the outlet ports are arranged in an asymmetrical fashion with respect to the centers of each inlet ports.

This arrangement provides more space to accommodate both a spark plug and injector intermediate the inlet and outlet ports at a center of the cylinder.

Each cylinder assembly may further comprise at least one rocker arm, the or each rocker arm rotating about a rocker arm shaft, each rocker arm receiving drive from a pushrod and drivingly connected to at least one inlet valve or at least one outlet valve to open and close each inlet valve or each outlet valve. Each combustion chamber may have an inlet rocker arm and an outlet rocker arm, the inlet rocker arm rotating about an inlet rocker arm axis and the outlet rocker arm rotating about an outlet rocker arm axis, the inlet rocker arm axis and outlet arm axis being distinct axes. The inlet rocker arm axis and outer rocker arm axis may be parallel. The inlet rocker arm axis and outer rocker arm axis may be co-axial. The inlet rocker arm axis and outer rocker arm axis may be non-parallel to the cam shaft.

In this arrangement, correctly organizing the rocker arms is key to providing a compact and efficient valve train assembly.

The internal combustion engine may further comprise at least two cylinders and the cylinder head of each cylinder assembly may be formed of a single piece of material.

The internal combustion engine may further comprise a valve train comprising a cam shaft arranged in an engine block and a series of pushrods and rockers arranged to open and close the inlet and outlet valves.

A method of operating the above described internal combustion engine is also provided, the method comprising steps of (a) drawing air into the cylinder of the internal combustion engine by opening the inlet ports and moving the piston to expand the combustion chamber volume; (b) closing the at least one inlet port; (c) injecting fuel into the combustion chamber volume via the fuel injector to form an air-fuel mixture within the combustion chamber volume; (d) compressing the air-fuel mixture being moving the piston to reduce the combustion chamber volume; (e) operating the spark plug to ignite the air-fuel mixture to expand the combustion chamber volume by exerting force on the piston; and (f) repeating steps (b) to (e) in a repeating fashion; wherein the fuel is hydrogen gas.

As such, a method for utilizing hydrogen-based fuel is provided for any application, which would produce a lower emissions internal combustion engine.

It is understood that the aspects and embodiments of the invention can be combined in any way, to take advantage of synergistic effects thereof.

BRIEF DESCRIPTION OF DRAWINGS

Embodiments will now be described by way of example only with reference to the accompanying figures, in which:

FIG. 7 is a first vertical cross-sectional end view of an engine of a second embodiment of the teachings along a non-linear plane for clarity with a piston at top dead center;

FIG. 8 is a second cross-sectional end view of the engine of FIG. 7 on the same plane but with a piston at bottom dead center;

FIG. 9 is an isometric view of a portion of the cylinder head of the engine of FIG. 7 showing inlet and outlet valves and runners;

FIG. 10 is a plan view of the portion of the cylinder head of FIG. 9;

FIG. 13 is an isometric view of a portion of the cylinder head of an engine of a third embodiment showing inlet and outlet valves and runners and a portion of a valve train;

FIG. 14 is a plan view of the portion of the cylinder head of FIG. 13;

DETAILED DESCRIPTION

Figure 1:
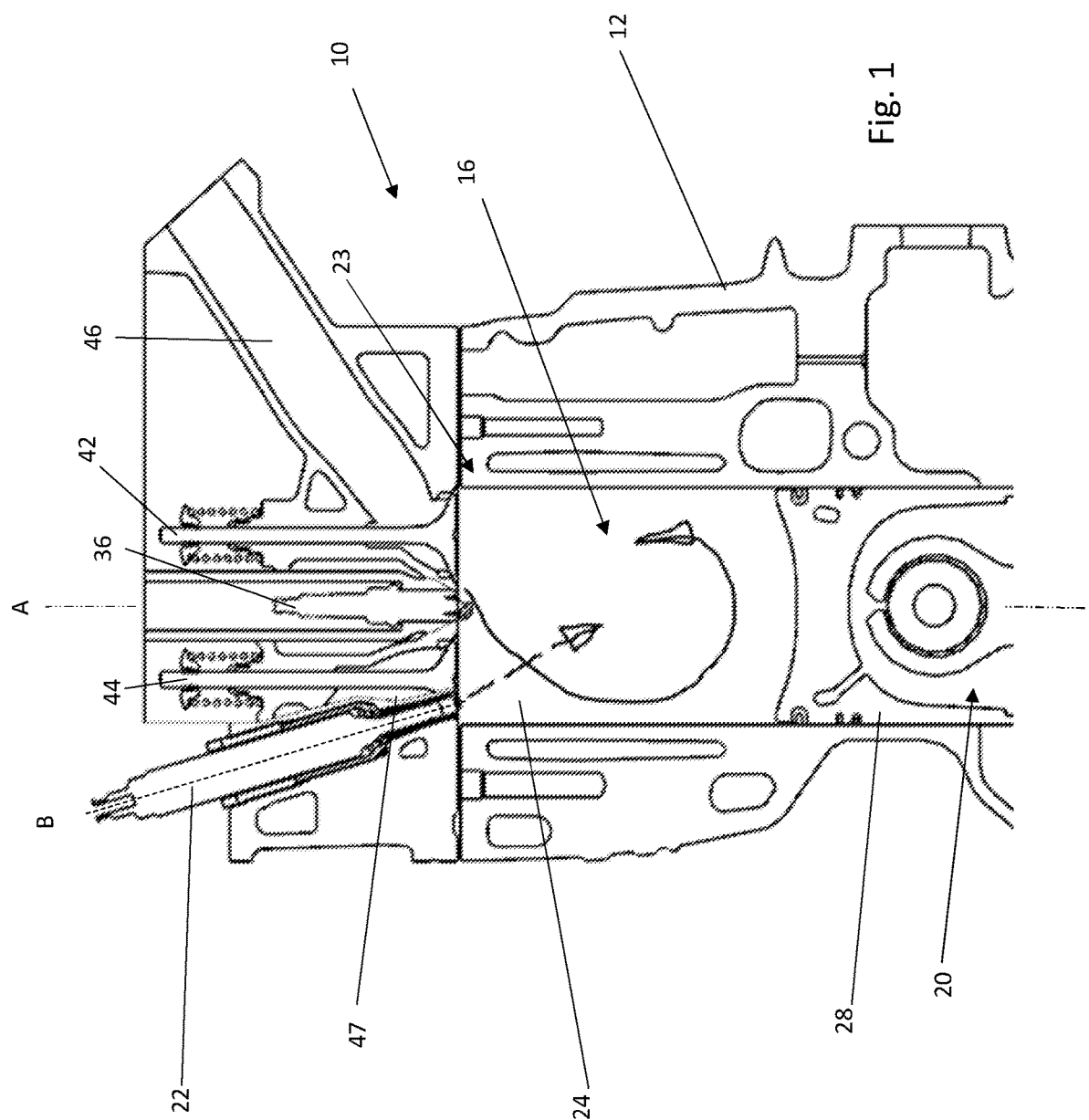
FIG. 1 is a vertical cross-sectional end view of an engine according to a first embodiment on a non-linear plane.

With reference to FIG. 1, an internal combustion engine for use with hydrogen fuel is generally indicated at 10.

The internal combustion engine 10 has an engine block 12 and a cylinder head 14. The engine block 12 and the cylinder head 14 define a series of cylinders 16. Each cylinder 16 defines a cylinder longitudinal axis A, as shown in FIG. 1.

Each cylinder 16 forms part of a cylinder assembly 23. Each cylinder assembly 23 has a piston assembly 20. FIG. 1 shows a cross sectional view through a single cylinder assembly 23. The remaining cylinder assemblies (not shown) of the internal combustion engine 10 are substantially identical to the cylinder assembly 23 shown.

In this embodiment, the internal combustion engine 10 is a straight four cylinder engine, with four cylinders 16 arranged parallel to one another in a linear formation, and four piston assemblies 20 along a common crankshaft 18. In alternative embodiments, the internal combustion engine has some other known cylinder arrangement, e.g. a straight six or V6.

A piston head 28 of the piston assembly 20 is arranged to move in a reciprocating manner along axis A and generate rotating drive to the crankshaft 18 as is well known per se in internal combustion engines.

The cylinder head 14 is formed within a cylinder head block 15. Each cylinder head 14 comprises two inlet ports 32 for air to be introduced into a combustion chamber 24 defined by the cylinder 16 and the piston assembly 20 and two outlet ports 34 for exhaust gases to be expelled. Through each cylinder head is arranged a spark plug 36 to ignite the hydrogen-air mixture. In this embodiment a single cylinder head block 15 is provided for all four cylinders heads 14 of the internal combustion engine 10, but in other embodiments a separate block may be provided for each cylinder head.

As shown in FIG. 1, the internal combustion engine 10 is of the direct injection type in this embodiment. The cylinder assembly 23 includes a fuel injector 22 mounted to a fuel injection port 54 for injecting fuel directly into the combustion chamber 24. The fuel injector 22 has a longitudinal axis B. The fuel injector is supported within the cylinder head 14.

Figure 2:
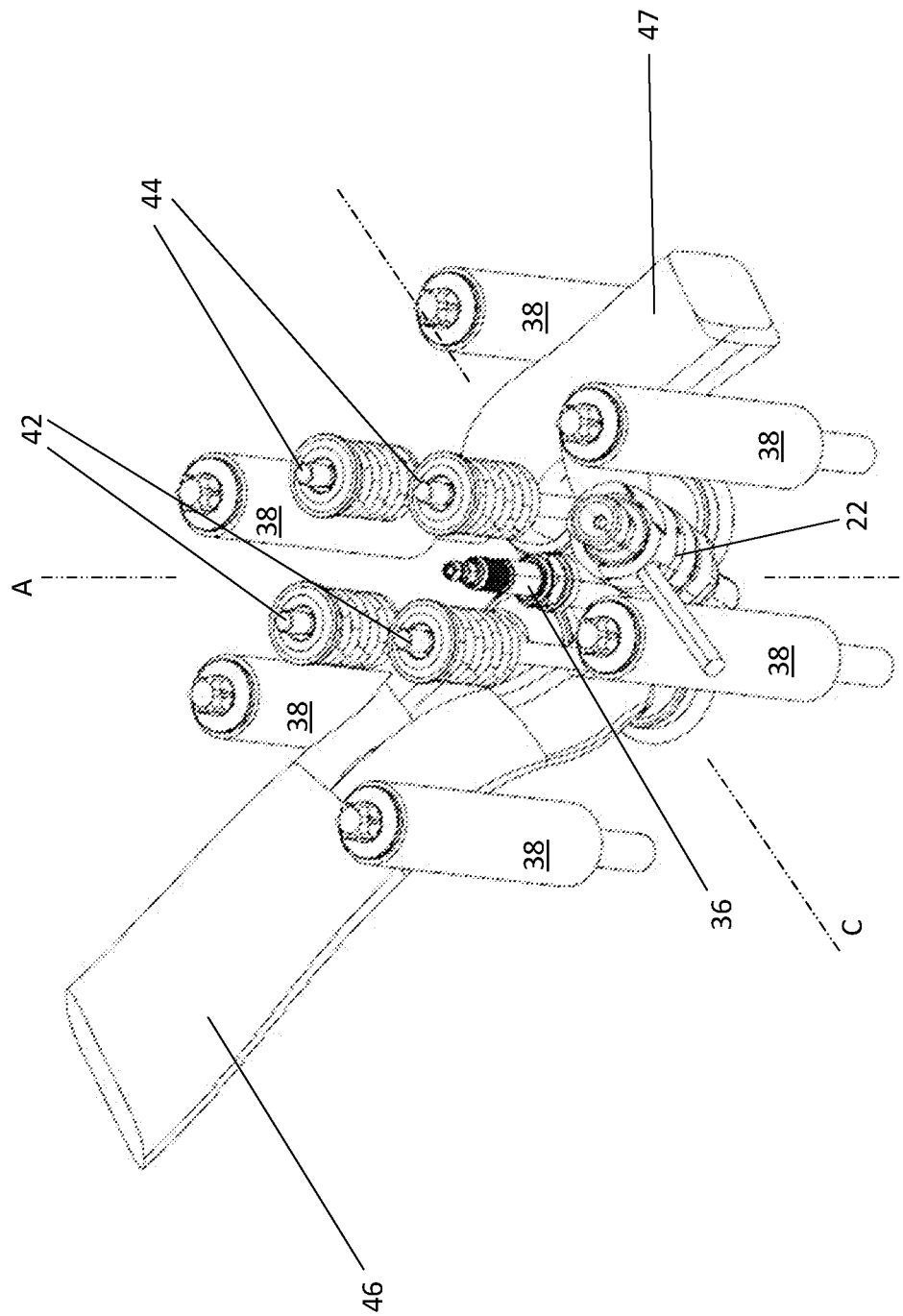
FIG. 2 is an isometric view of a portion of the cylinder head of the engine of FIG. 1 showing inlet and outlet valves and runners.
Figure 5:
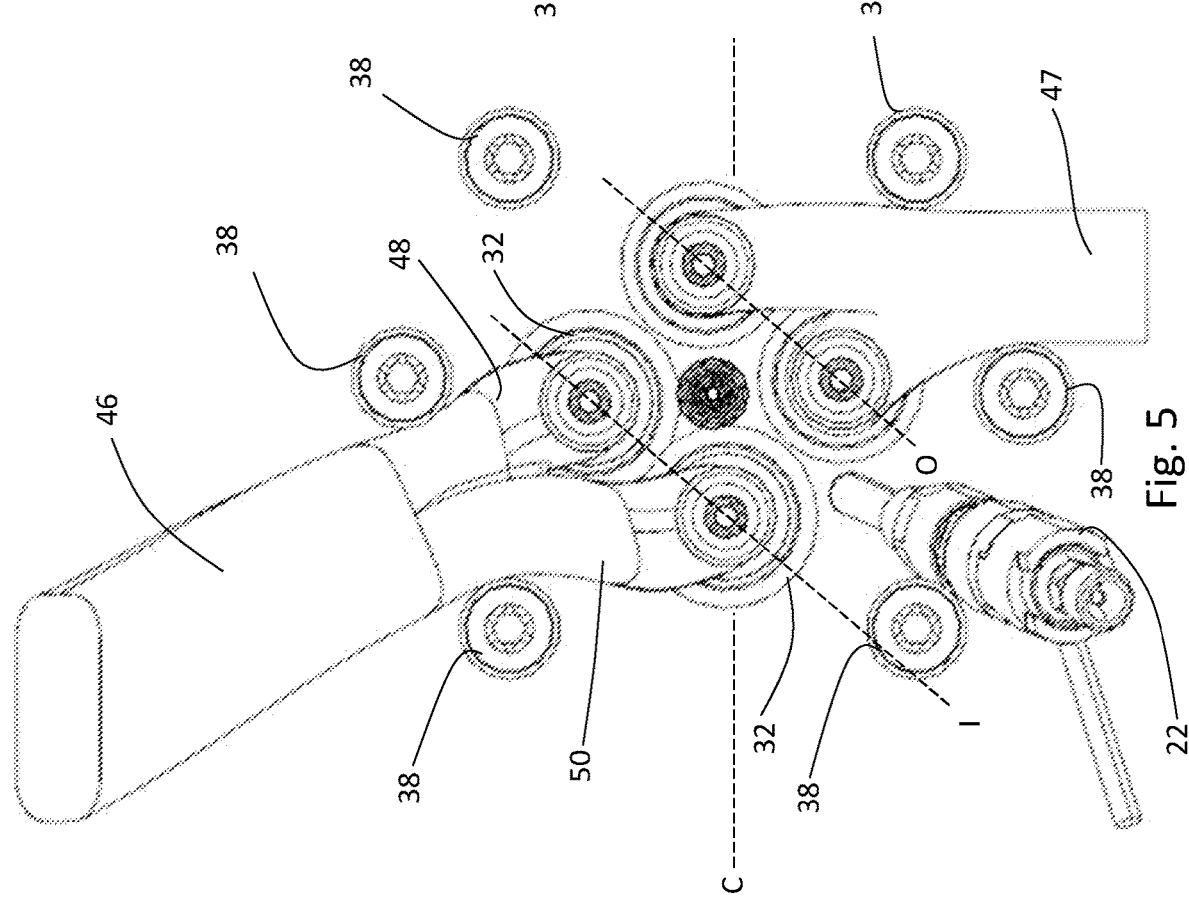
FIG. 5 is a plan view of the cylinder head of FIG. 2.

Each cylinder head 14 is secured by six bolts 38 to the engine block 12, as best seen in FIGS. 2 and 5. The bolts 38 are arranged symmetrically about a plane defined by a rotating axis C of the crankshaft 18 and the axis A of the cylinder 16. The angle between an adjacent two of the six bolts 38 is 46°. In this embodiment two sets of three bolts 38 are provided either side of the crank axis with an angle of 88° between the outermost bolts 38 of each set. Other angles in the range of 36° to 60° are also envisaged between bolts 38 on each side of the crank axis, which are set by the restraints of the cylinder head 14.

So called "six bolt heads" are commonly found in compression ignition internal combustion engines—e.g. diesel engines—which operate at higher compression ratios and pressures than spark ignition engines—e.g. gasoline engines. Six bolts per cylinder are typically required to maintain the integrity of the sealing between the engine block 12 and cylinder head 14 under these higher pressures, whereas gasoline engines typically utilize four bolts per cylinder. The six bolts 38 restrict the space available to supply the combustion chamber 24 with the required air, hydrogen fuel and spark, and allow exhaust gases to be outlet, whilst ensuring the engine 10 runs efficiently and is compact.

Compression ignition engines are commonly used in heavy duty applications where their high torque output at low rpm is beneficial for the hauling of heavy loads, providing power to hydraulic pumps driving actuators of working arms of excavators or materials handling vehicles, or driving power take-offs to working implements such as agricultural machinery. When utilizing hydrogen as a fuel in such applications, it is also desirable to maintain similar torque characteristics despite the change in fuel and the need to ignite the fuel using a spark.

Each inlet port 32 is selectably closable by a corresponding inlet valve 42, whilst each outlet port 34 is closable via a corresponding outlet valve 44. These inlet valves 42 and outlet valves 44 are part of a valve train 40. The inlet and outlet valves 42, 44 are located, when closed, in the corresponding port 32, 34 in a recessed position from an inner surface 64 of the cylinder head 14. The inlet ports 32 have a larger diameter than that of the outlet ports 34 in order to optimize the airflow into the combustion chamber and achieve an optimized air-hydrogen mixture for lean combustion.

In this embodiment the inlet and outlet valves 42, 44 are arranged to be actuated parallel to axis A, i.e. vertically as depicted (although in certain machine installations the axis may not be vertical). This simplifies the construction of the valve train 40 and cylinder head 14. In particular, it may enable rocker arms (not shown) for the inlet and outlet valves 42, 44 to pivot about common axes, or at least parallel axes, potentially on a single rocker shaft (not shown) extending the length of the cylinders 16.

Figure 3:
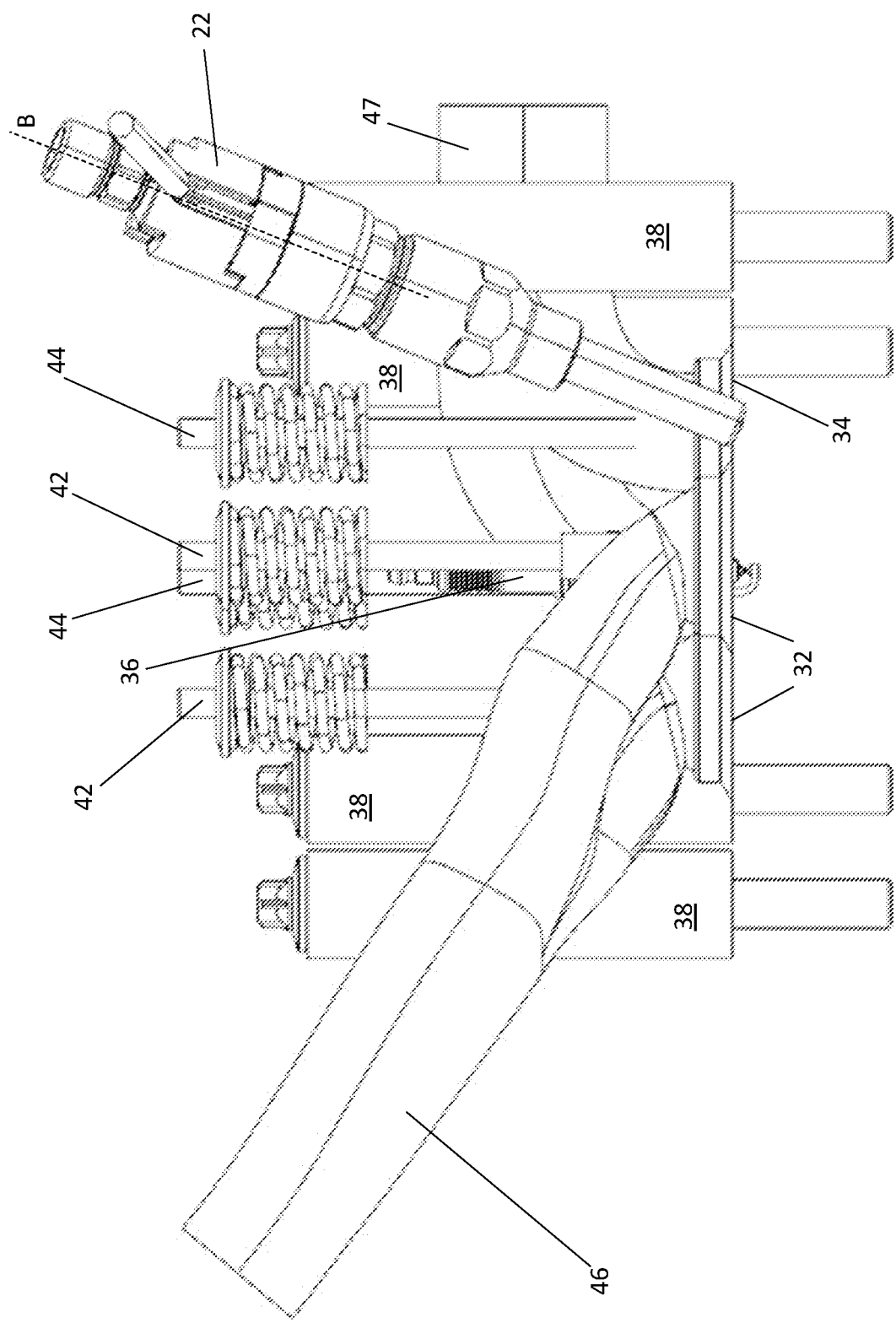
FIG. 3 is an end view of the portion of the cylinder head of FIG. 2 with inlet ports visible.

The engine 10 further comprises inlet runners 46 arranged to feed into the inlet ports 32 of each cylinder head 14 from an inlet manifold (not shown). As best seen in FIGS. 3 and 5, the inlet runners 46 bifurcate into a first section 48 and a second section 50, the two sections 48, 50 being connected to different inlet ports 32. The first and second sections 48, 50 have non-equal lengths. The inlet runners 46 extend between two of the six bolts 38. In this way, the inlet runner 46 leaves more space available to locate components such at the spark plug 36 and fuel injector 22.

Similarly, outlet runners 47 connect the outlet ports 34 of each cylinder 16 with an exhaust manifold (not shown) and are bifurcated where they connect to each port and merge before connecting to the manifold, and extend between two of the six bolts 38 on the opposite side of the cylinder head 14.

Figure 6:
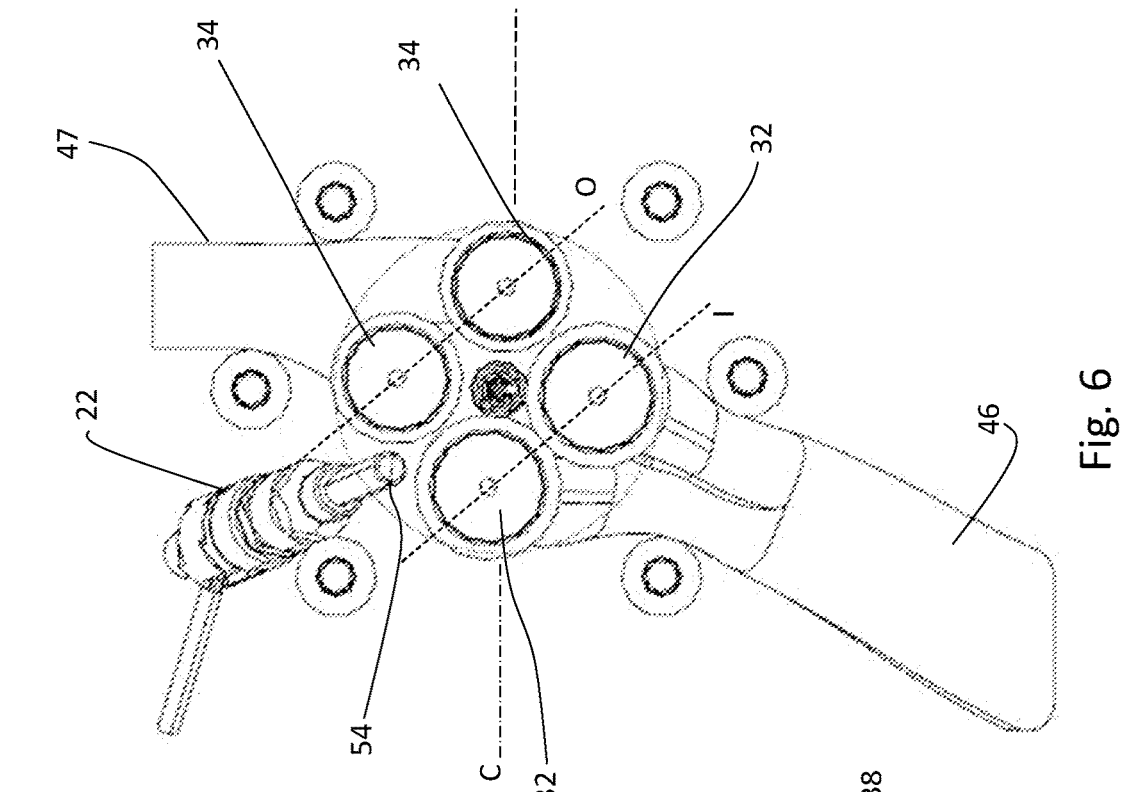
FIG. 6 is an underside flame face view of the cylinder head of FIG. 2.

In this embodiment, as best seen in FIGS. 5 and 6, imaginary lines I and O passing through centers of the inlet ports 32 and outlet ports 34 respectively are arranged at a non-zero, non-right angle to the axis of rotation C of the crankshaft 18. This angle is 50°, however angles in the range of 45° to 55° are also envisaged which allow for the packaging of components such as the fuel injector 22. This is referred to as the ports 32, 34 being "skewed".

This can be contrasted with conventional gasoline engines where the four bolt pattern enables two inlet ports to be arranged on one side of the cylinder head 14 with an imaginary line extending between their centers being parallel to axis C, and outlet ports on the opposite side in a similar arrangement to generate a tumbling motion within the cylinder 16 (a so-called cross flow configuration). It can also be contrasted with known diesel engines where the inlet ports are arranged with an imaginary line between their centers being arranged transverse axis C and the outlet ports being arranged in a similar configuration in an opposite sector of the cylinder head 14 (a so-called tandem configuration). This tandem configuration in conjunction with a particular arrangement of inlet and outlet runners can achieve a swirling motion that is desirable for an efficient and low emission compression ignition combustion.

In this embodiment, as best seen in FIGS. 5 and 6, the inlet ports 32 and outlet ports 34 have centers that are arranged in a symmetrical fashion with respect to one another. The center of each inlet port 32 is arranged in a symmetrical fashion with respect to the center of a corresponding outlet port 34. The line of symmetry is a diameter bisecting the cylinder head 14.

Figure 4:
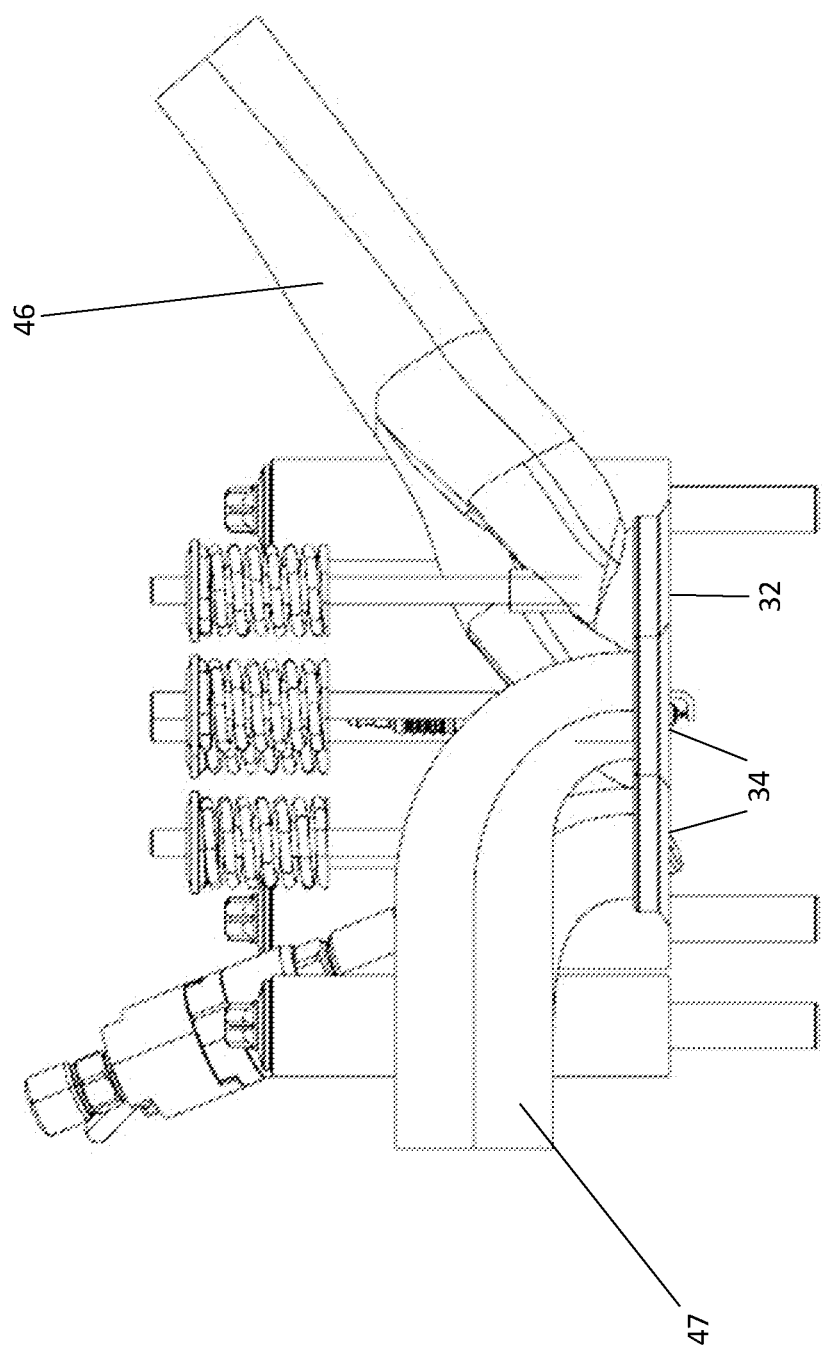
FIG. 4 is an opposite end view of the portion of the cylinder head of FIG. 2 with outlet ports visible.

With reference to FIGS. 3 and 4 in particular, it can be seen that the inlet runner 46 is inclined with respect to a lower face of the cylinder head 14 at a relatively steep angle, which in this embodiment is approximately 36°, but may be in the range of 32° to 36°. This angle generates the tumble motion, with the upper end of the range being constrained by the packaging of other components such as the fuel injector 22, and minimizing the height of the cylinder head.

The combination of the skewed arrangement of the inlet ports 32 and the bifurcation and inclination of the inlet runner 46 as described above has been found to generate a motion of the air during the inlet stroke of the engine 10 that is a hybrid of a swirling motion (motion about a vertical axis) and a tumbling motion (about a horizontal axis) as indicated in simplified fashion by the curved arrow of FIG. 1. When hydrogen fuel is injected into this air motion (as indicated by the dashed arrow of FIG. 1) it produces a more homogeneous fuel air mixture which promotes efficient and low emission combustion.

In this embodiment the spark plug 36 is also vertically located in the center of the cylinder head 14 intermediate the inlet and outlet ports 32, 34 to promote even combustion in the combustion chamber 24. In this embodiment the spark plug 36 is an M14 diameter spark plug which has been found to be more durable that smaller diameter spark plugs when used to ignite hydrogen-air mixtures.

The fuel injector 22 is arranged so that the injection port 54 is located intermediate one of the inlet ports 32 and one of the outlet ports 34. In this embodiment, the fuel injector 22 is arranged radially outward of a center of one of the inlet ports 32. To permit it to be mounted within the cylinder head block 15, avoiding the bolts 38 and other features such as galleries for circulation of coolant (not shown), the injector 22 is arranged at a non-zero angle to the axis A. In this embodiment the angle is a compound angle, being 3° from the vertical of a plane defined by axes A and I or O (with a potential range of 3° to 8°) and 16° in a plane normal to A-I and A-O planes (with a potential range 11° to 21°).

This angle may also allow the hydrogen to be injected in a direction where it better mixes with the tumbling and swirling air to further improve the homogeneity of the mixture. In variants of this embodiment, the fuel injector 22 may instead be located above the inlet runner 46 so as to inject via a port (not shown) located between the inlet ports 32 and the spark plug 36. In further variants the fuel injector 22 may be located below the inlet runner 46 to inject via a port (not shown) that is intermediate the two inlet ports 32 and radially outward of their centers.

The engine 10 of the first embodiment therefore enables a compression ignition internal combustion of a configuration typically used for generating high torque at low engine speeds to achieve similar characteristics with spark ignition of hydrogen based fuels, whilst ensuring low emissions. In particular, an existing diesel compression ignition engine block may be utilized without adaptation. Only adaptations are required to the cylinder head 14 and in terms of core engine castings. As a result, the investment required to retool is minimized and existing supply chains may be utilized manufacture revised components. As a result, a zero or low carbon prime mover may be provided at lower cost and with a shorter development time than alternatives such as hydrogen fuel cells.

A second embodiment is shown in FIGS. 7 to 12. In this embodiment similar parts are denoted by the same reference numerals to the first embodiment, but with the prefix "1". Only parts which differ from the first embodiment are discussed in detail.

Figure 11:
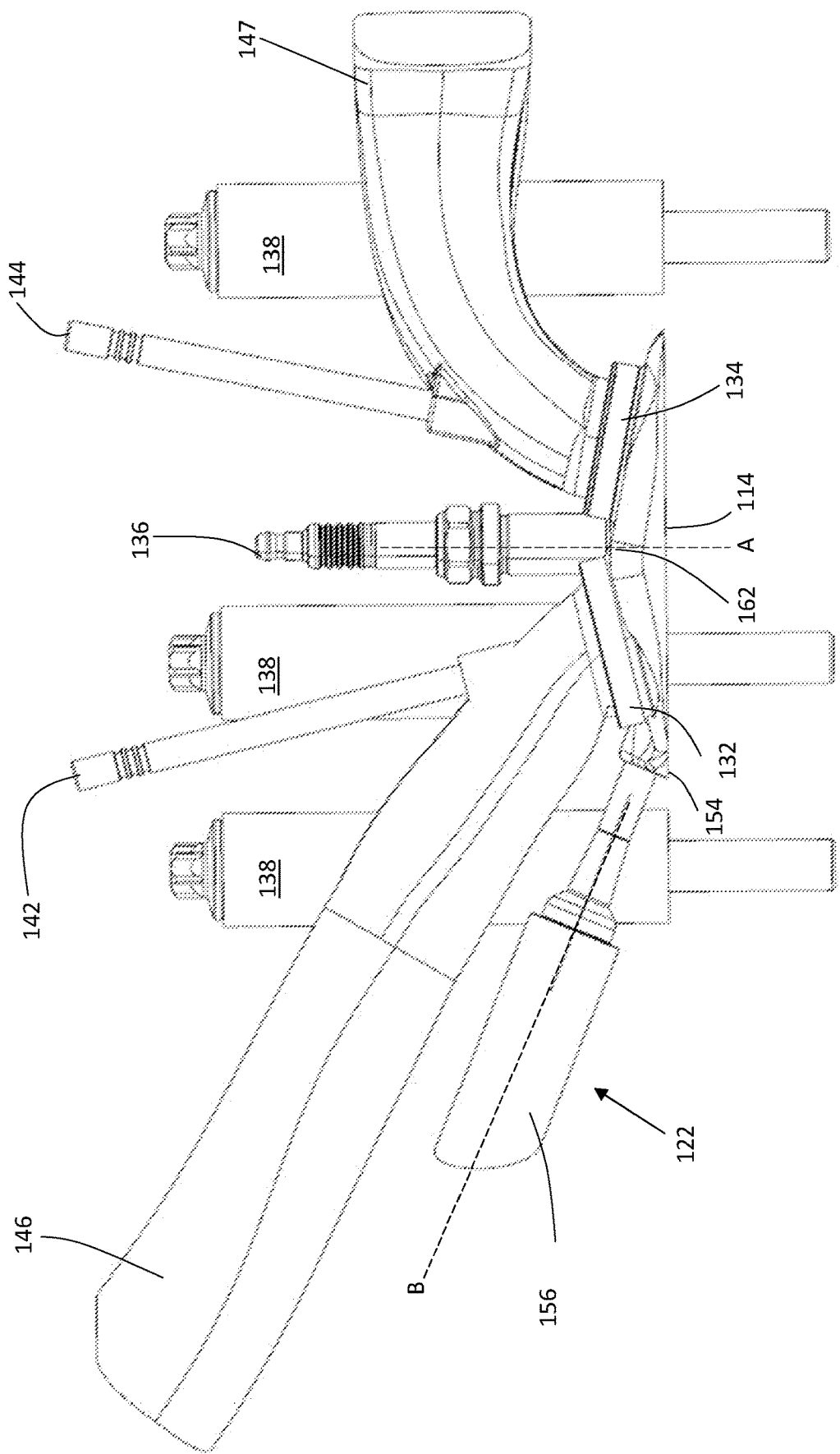
FIG. 11 is an end view of the portion of the cylinder head of FIG. 9.
Figure 12:
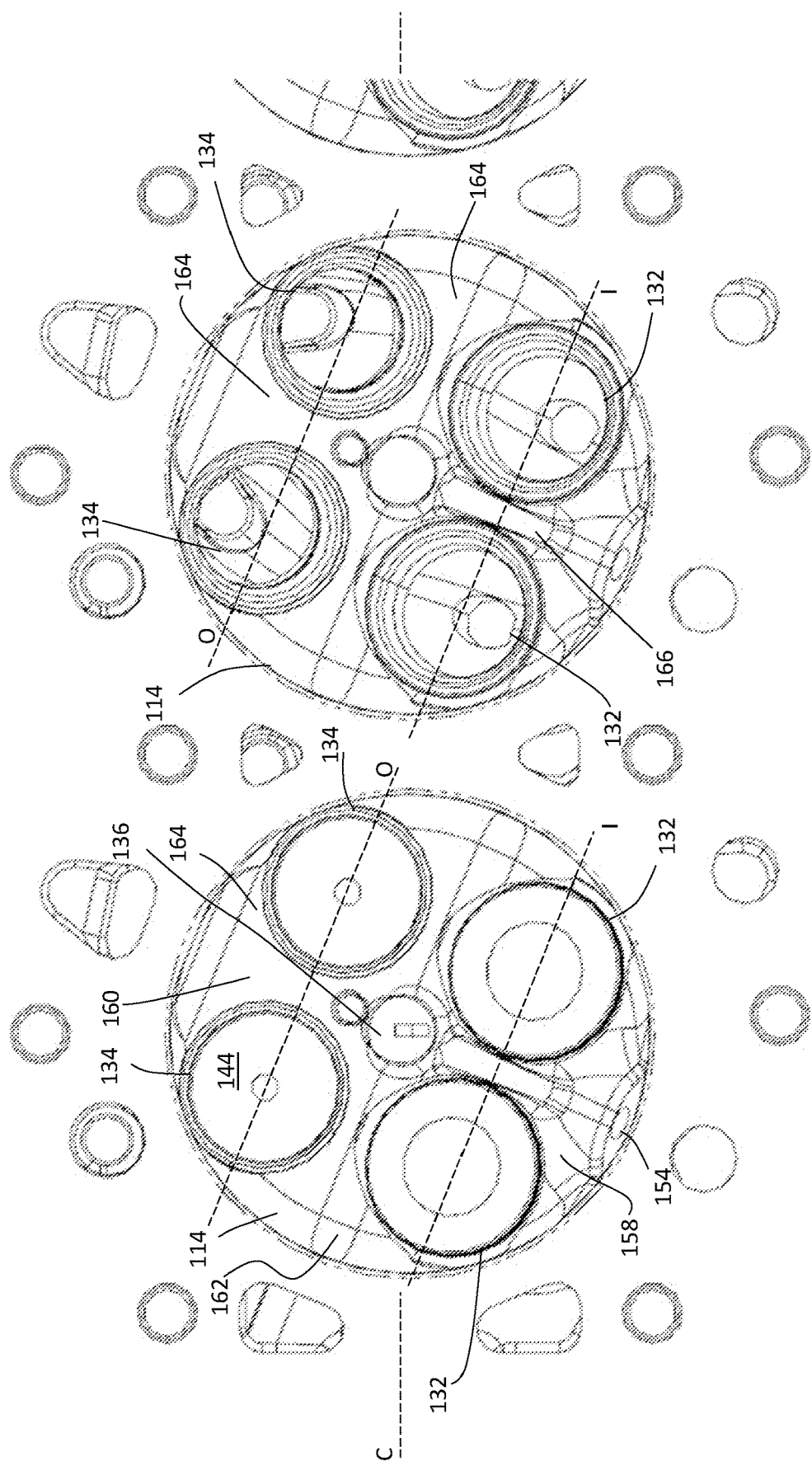
FIG. 12 is an underside flame face view of a portion of the cylinder head of FIG. 9.

In this embodiment, an internal combustion engine for use with hydrogen fuel is generally indicated at 110. With reference to FIGS. 11 and 12 in particular, each cylinder head 114 comprises a first face 158 and a second face 160 which define the flame face of the combustion chamber (that portion of the cylinder head 114 that forms a wall of the combustion chamber). The first face 158 and the second face 160 are generally planar and inclined relative to one another and meet at an apex 162. This is commonly referred to as a "pent roof".

The first face 158 is angled with respect to a plane transverse axis A by 13.5°, however, other angles in the range of 12.5° to 14.5° are also envisaged. Likewise, the second face 160 is angled with respect to plane transverse axis A by 11.5°, however, angles in the range of 10.5° to 12.5° are also envisaged. These ranges of angles optimize the tumble motion of the inlet and exhaust mixtures (see curved arrow of FIG. 8), whilst being suitable for the required packaging of components around the cylinder head 114. Any total angle greater than the range of 23° to 27° would result in problems with excessive recesses on the inner surface 164 of the cylinder head 114, impacting air-fuel mixture motion. In this embodiment the angle of the faces with respect to the plane transverse axis A differ, such that the apex 162 is offset from a center of the flame face and the first face 158 has a smaller projected area than the second face 160. The apex 162 has a curved transition from the first face 158 to the second face 160.

The two inlet ports 132 are located within the first face 158 and the two outlet ports 134 are located within the second face 160. These are fed by inlet and outlet runners 146, 147 respectively, the inlet runner 146 bifurcating into a first section 148 and a second section 150. The inlet ports 132 are larger than the outlet ports 134, such that in this embodiment the inlet ports 132 extend into the apex 162.

As in the previous embodiment, imaginary lines I and O are arranged at a non-zero, non-right angle to the axis of rotation C of the crankshaft 118, as best seen in FIGS. 10 and 12. The apex 162 is also arranged at a non-zero, non-right angle to the axis of rotation C of the crankshaft 118, at the same angle as that of the imaginary lines I and O. In comparison with the first embodiment this skew angle is lower, being approximately 23°, which is substantially the same angle formed by a line projecting from the centers of adjacent pairs of bolts 138 intersecting with axis C. Other angles in the range of 22° to 24° are also envisioned, however this angle range is limited by needing to provide a cooling jacket around the nozzle of the fuel injector 22 located between the inlet ports 132. This allows the inlet runner 146 to extend between the bolts 138 normal to this line, and for the bifurcation being such that the first section 148 and second section 150 are of identical length and are shaped as identical mirror images.

In this embodiment, an axis of movement of the inlet valves 142 and outlet valves 144 are arranged substantially perpendicularly to the first face 158 and second face 160 respectively. So as to further enhance the tumble motion at least the inlet valves 142 are recessed into their respective ports 132.

In variants of this embodiment, the axis of operation of the inlet valves 142 are arranged perpendicularly to the first face 158, however angles in the range of 12° to 13.5° with respect to a plane transverse axis A are also envisioned. Likewise, in this variant, the axis of operation of the outlet valves 144 are arranged perpendicularly to the second face 160. However, angles in the range of 10° to 11.5° with respect to a plane transverse axis A are also envisaged. These angles ensure that the inlet and outlet mixture flows do not soil the inner surface 164 of the cylinder head 114.

The angle of inlet and exhaust of combustion components though inlet and outlet ports 132, 134 provided by the pent roof, the straight path and equal length bifurcations described above in combination with the inclined entry angle of the inlet runner allows a purer tumble motion of the air to be created across a full width of the combustion chamber 24 during the inlet stroke. This promotes homogenization of the combustion mixture.

In this embodiment, as best seen in FIG. 12, each cylinder head 114 further comprises a channel 166 located on the inner surface 164 of the cylinder head 114. The channel 166 extends along the inner surface 164 in a radial orientation and is aligned with axis B of the fuel injector 122. This channel 166 prevents soiling of the inner surface 164 of the cylinder head 114 that would occur due to the angle of the fuel injector 122 and allows the hydrogen based fuel to mix effectively with the air during the inlet and compression stroke. This promotes a cleaner and more efficient combustion cycle.

In this embodiment, as best seen in FIGS. 9 and 11, the fuel injector 122 is arranged so that the injection port 154 is located intermediate the two inlet ports 132 such that axis B of the fuel injector 122 is at an angle of 21° with respect to the plane of axis C. However, variants of this embodiment with other angles in the range of 19° to 23° are also envisioned, in order to take into account thickness constraints of the cylinder head 114 and water jacket, and to package the fuel injector 122 around the proximate components, in particular the inlet runner 146. The body 56 of the fuel injector 122 is located between the cylinder head 114 and a lower wall of the inlet runner 146.

As in the first embodiment, the spark plug 136 is centrally located co-axial with axis A, and is offset from the apex 162.

A third embodiment is shown in FIGS. 13 to 16. In this embodiment similar parts are denoted by the same reference numerals to the second embodiment, but with the prefix "2" rather than "1". Only parts which differ from the first embodiment are discussed in detail.

In this embodiment, an internal combustion engine for use with hydrogen fuel is generally indicated at 210. As in the second embodiment, a "pent roof" is provided by angled first and second faces 258, 260 meeting at apex 162. Also, as in the second embodiment, the apex 262 and imaginary lines I and O are arranged at non-zero, non-right angles to the axis of rotation C of the crankshaft 218, as best seen in FIG. 14. The inlet and outlet ports 232, 234 are fed by inlet and outlet runners 246, 247 respectively.

Figure 15:
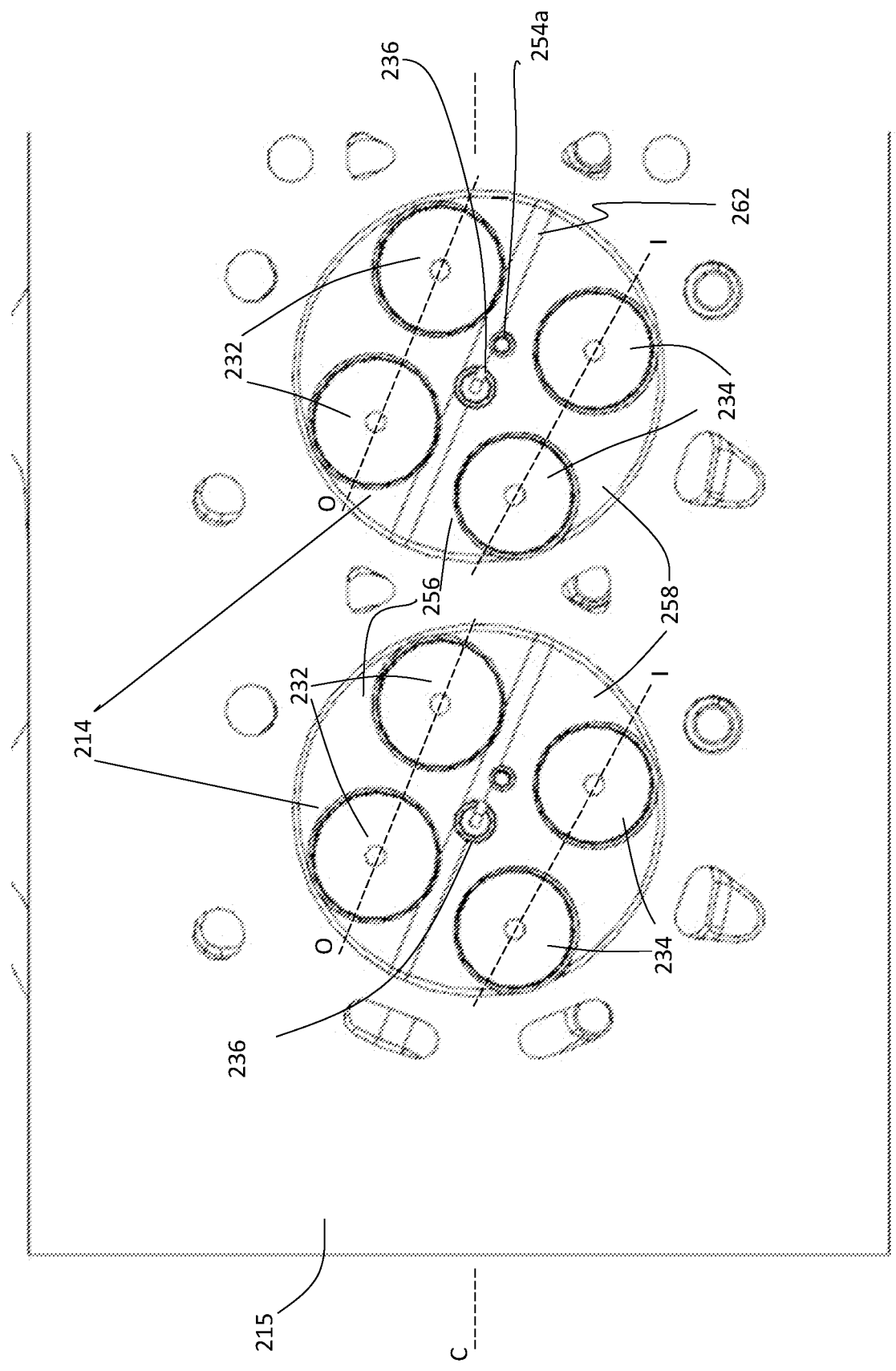
FIG. 15 is an underside flame face view of the cylinder head of FIG. 13.
Figure 16:
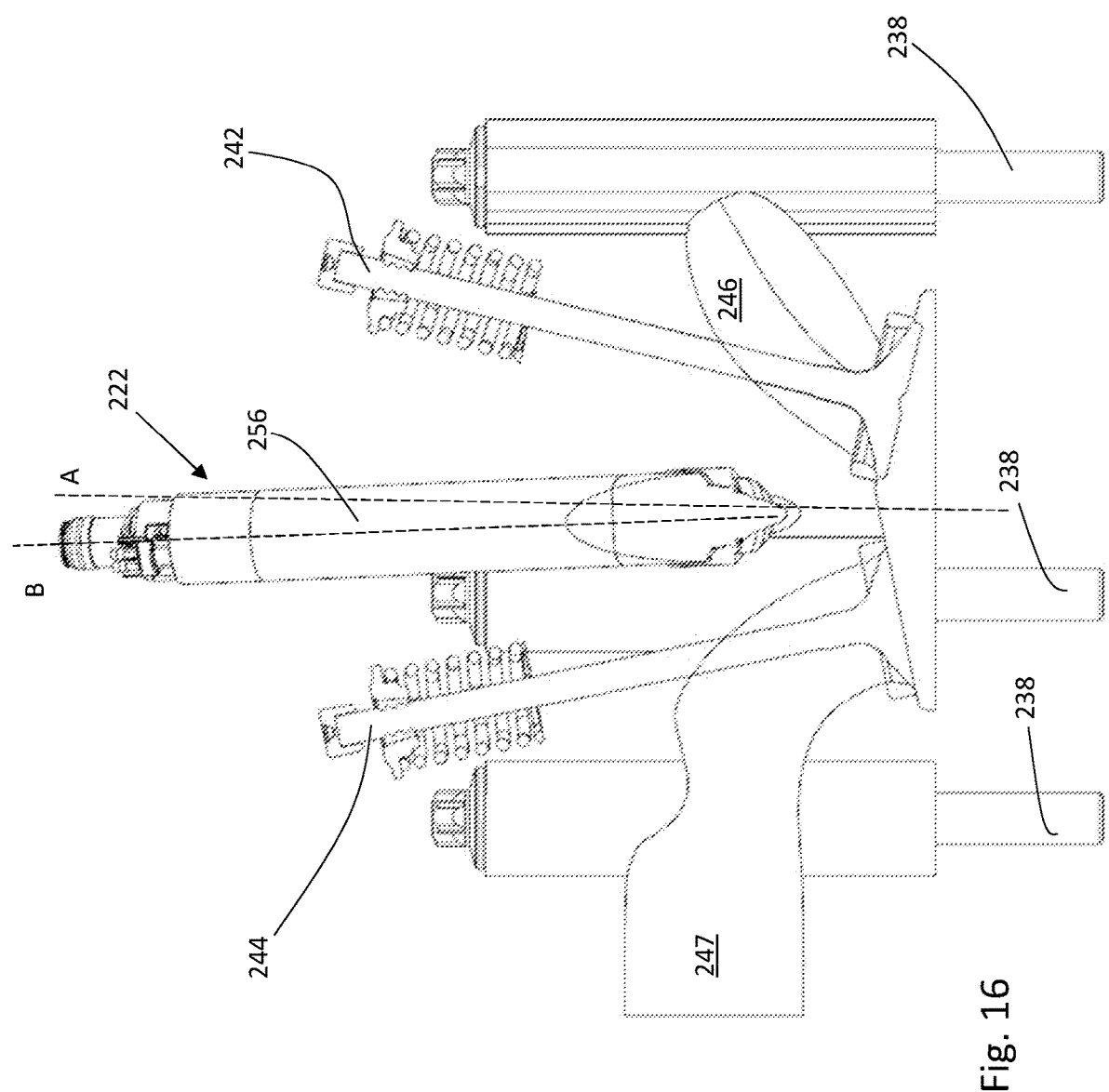
FIG. 16 is a vertical cross-sectional end view of the portion of the cylinder head of FIG. 13.

However, in this embodiment, as best seen in FIG. 15, the inlet ports 232 and outlet ports 234 have centers that are arranged in an asymmetrical fashion with respect to one another. In other words, the imaginary lines I and O are non-parallel in their arrangement. Whilst imaginary line I is parallel to the apex 262, the imaginary line O is at a similar but non-equal angle. This difference in angle is 5.8°, however variants of this embodiment with angles in the range of 5.3° to 6.3° are also envisioned. This angle range is defined by valve seat inserts of the inlet ports 232 needing to be a minimum of 9 mm away from each other at their closest points and the need to achieve a minimum wall thickness of 5 mm around a bore of the nozzle of the fuel injector 222. This asymmetry provides additional space for mounting the injector 222 as discussed below.

Figure 17:
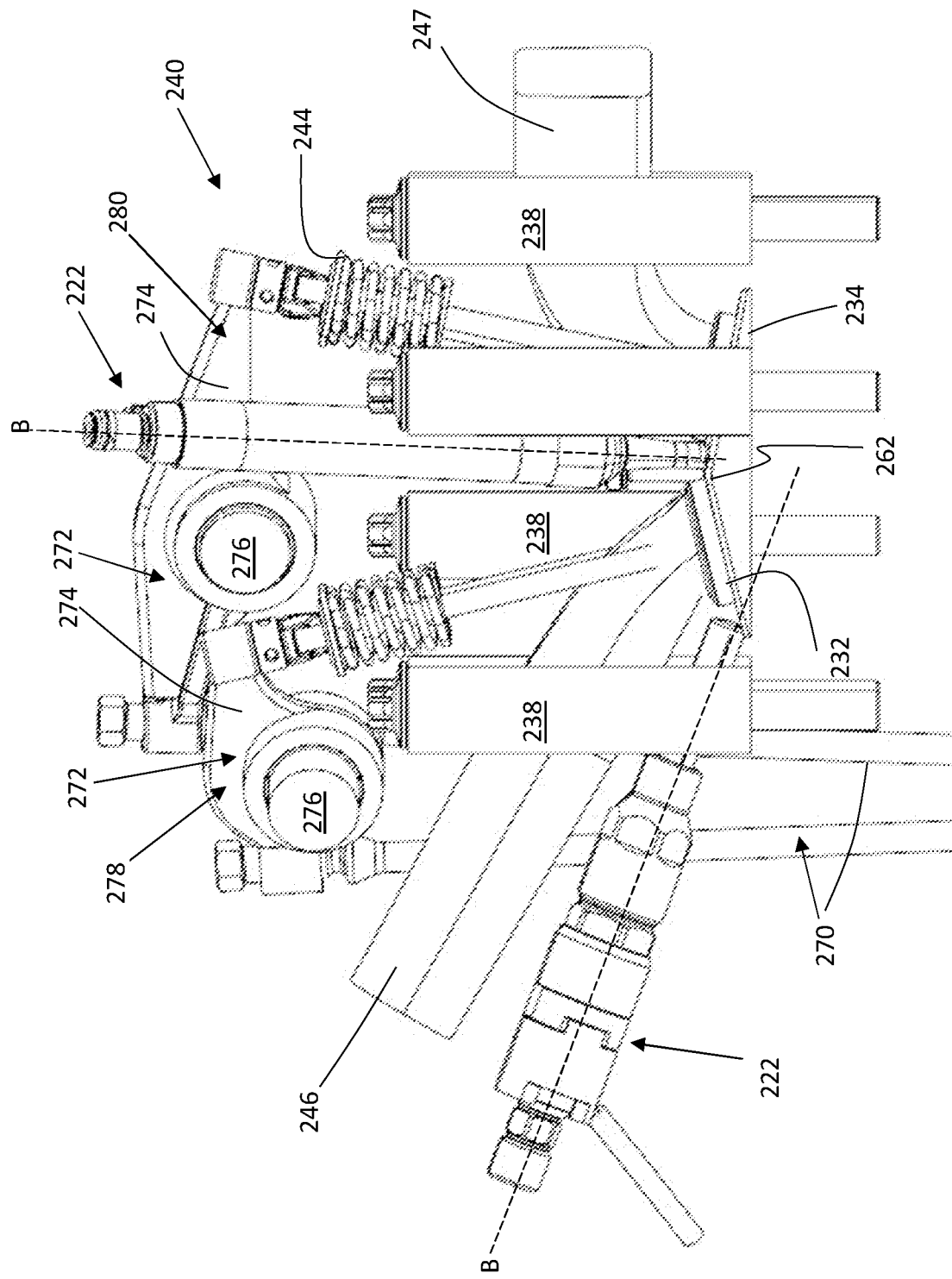
FIG. 17 is an end view of the portion of the cylinder head of FIG. 13.

FIGS. 13, 14 and 17 show two fuel injectors 222, however this is for illustrative purposes only as possible mounting locations. In use, only one fuel injector 222 is present in a selected one of these two locations.

In some variants of this embodiment, the fuel injector 222 is located in a port 254a that is adjacent the spark plug 236 in the space intermediate the inlet and outlet ports 232, 234. It will be appreciated that the pent roof arrangement further enables positioning at this location since the stems and return springs of the inlet and outlet valves 242, 244 are inclined away from each other. This allows for a suitable separation of the injector 222, spark plug 236 and valves, with suitably strong mountings for each, and space for coolant galleries therebetween as required.

Additionally, the injector 222 is inclined at an angle of 3° with respect to axis A in a radially outward direction to separate the injector 222 from the spark plug 236, and further to inject the hydrogen towards the center of incoming air during the intake stroke for improved mixing. However, further variants of this embodiment with other angles in the range of 3° to 8° are also envisaged to provide for suitable targeting of the fuel, whilst not impinging on space required for the outlet ports 232 and spark plug 236. Viewed in a plane at 90° to that of FIG. 16, the injector is angled at 16 degrees to vertical axis A (i.e. the angle is a compound angle) with a possible range of 11° to 21°. This range of angles allows for targeting the injected fuel flow into the mid-section of the tumble motion in the cylinder 16 with acceptable inclination and packaging of the spark plug 236.

Alternatively, in another variant of this embodiment, the fuel injector 222 may be located as in the second embodiment at an angle of 21° with respect to the plane of axis C (with other angles in the range of 19° to 23° possible).

FIGS. 13, 14 and 17 show aspects of the valve train 240 associated with this embodiment. The valve train comprises a cam shaft (not shown) arranged in the engine block 212 and a series of push rods 270 and rockers 272. These are arranged to open and close the inlet and outlet valves 242, 244. The rockers 272 comprise inlet rockers 278 and outlet rockers 280, each connected to an inlet valve 242 or outlet valve 244 respectively. The inlet rockers 278 rotate about an inlet rocker axis 282, whilst the outlet rockers 280 rotate about an outlet rocker axis 284. As can be seen from FIG. 14 in particular, the arrangement allows for the valve train 240 to clear, in particular, the inlet runner whilst having the rocker shaft axes parallel with axis C.

Figure 18:
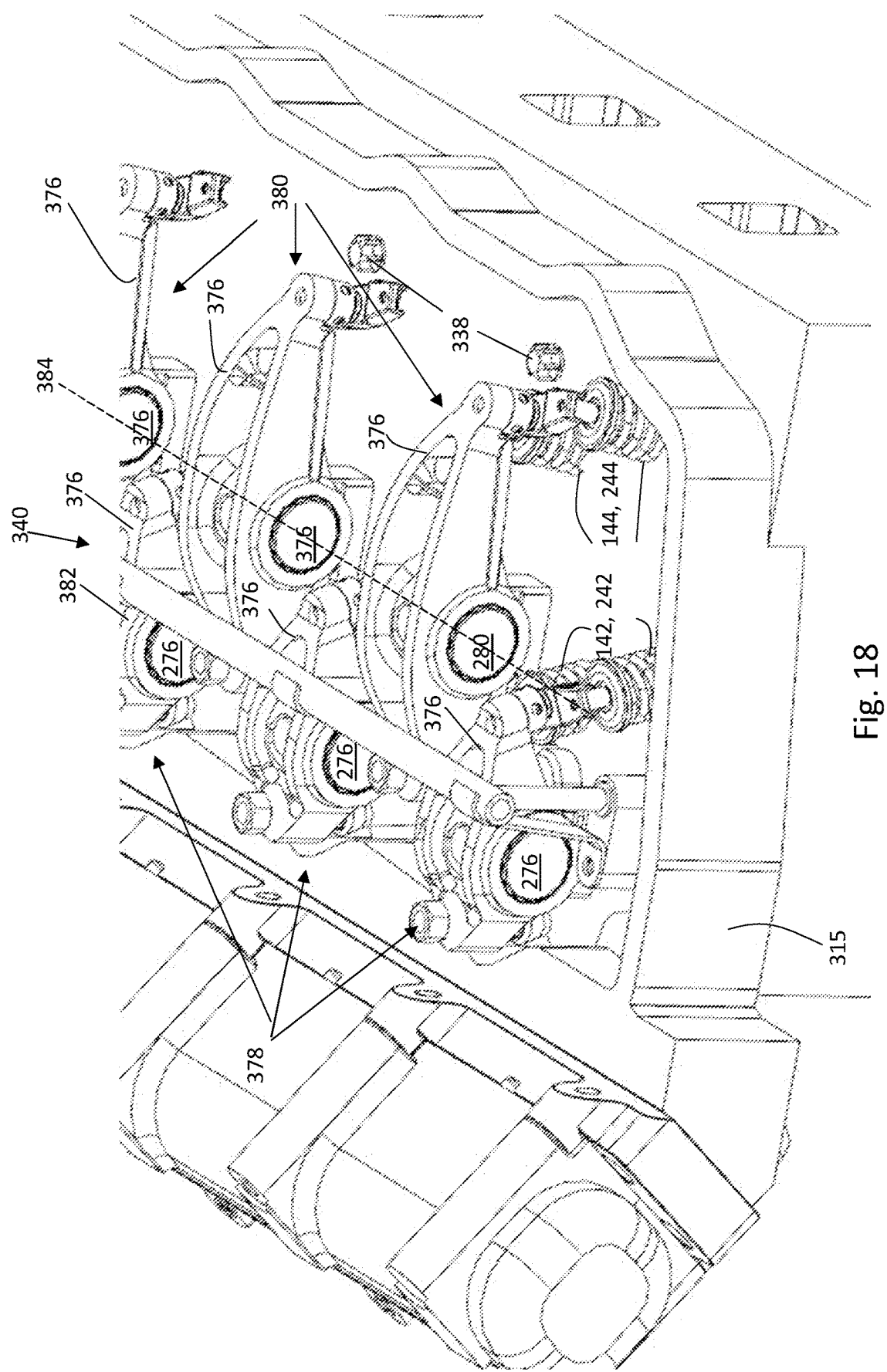
FIG. 18 is an isometric view of a portion of the cylinder head showing alternative valve train components for use with the valves of the second and third embodiments.
Figure 19:
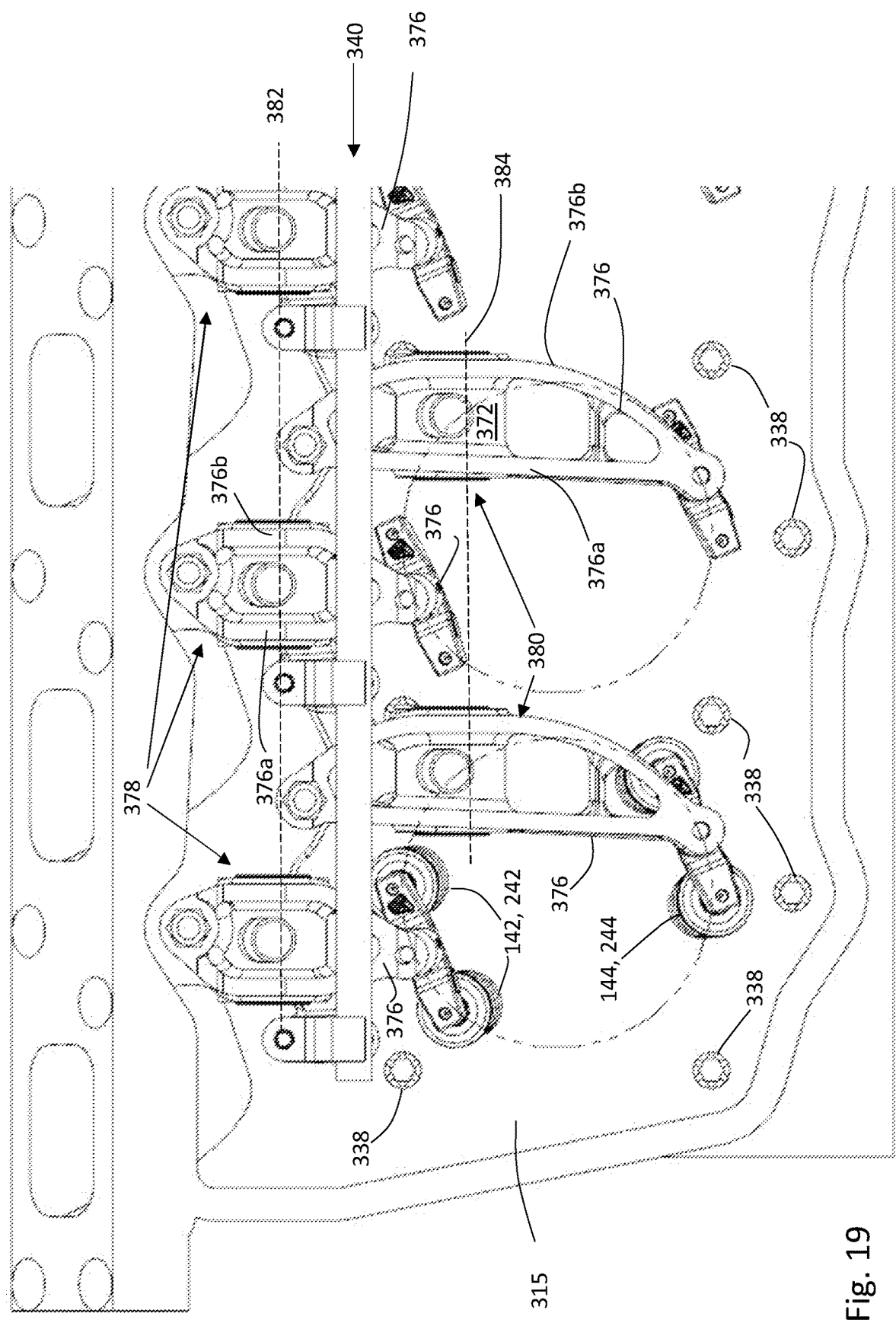
FIG. 19 is a plan view of the portion of the cylinder head of FIG. 18.

FIGS. 18 and 19 illustrate a variant valve train 340 that may be used to actuate the inlet and outlet valves 142, 242, 144, 244 of the second and third embodiments. In this variant similar parts are denoted by the same reference numerals to the third embodiment, but with the prefix "3" rather than "2". Only parts which differ from the first embodiment are discussed in detail.

The valve train 340 comprises a cam shaft (not shown) arranged in the engine block 12 and a series of push rods 370 and rockers 372. These are arranged to open and close the inlet and outlet valves 142, 242, 144, 244.

The rockers 372 comprise inlet rockers 378 and outlet rockers 380, each connected to an inlet valve 142, 242 or outlet valve 144, 244 respectively. The inlet rockers 378 rotate about an inlet rocker axis 382, whilst the outlet rocker 380 rotate about an outlet rocker axis 384. The inlet rocker axis 382 and the outlet rocker axis 384 are distinct axes. The inlet rocker arm axis 382 and the outlet rocker axis 384 are parallel to each other and parallel to the cam shaft.

In contrast to the valve train 240, in this embodiment the rockers 378 are formed as two arms 376a and 376b that are spaced to allow the rockers to pivot on a shaft mounted to the cylinder head 214 via a central pedestal 386, but which meet at their ends where the rockers interface with the respective pushrods 370 and bridges to actuate the valves 342, 344. This arrangement simplifies the mounting of the arms.

It is understood that the aspects and embodiments of the invention can be combined in any way, to take advantage of synergistic effects thereof.

The invention claimed is:

1. An internal combustion engine for use with hydrogen fuel, the engine having at least one cylinder assembly, each cylinder assembly comprising:
    a combustion chamber comprising a cylinder, a cylinder head and a reciprocating piston assembly;
    two inlet ports within the cylinder head, the inlet ports being selectively closable by a corresponding inlet valve;
    an inlet runner extending to the inlet ports;
    at least one outlet port within the cylinder head, the at least one outlet port being selectively closable by a corresponding outlet valve;
    at least one spark plug mounted to the cylinder head;
    a fuel injector mounted to the cylinder head and arranged to inject hydrogen fuel into the cylinder via an injection port; and
    a piston assembly comprising a piston and a crankshaft;
    a line passing through a center of one of the inlet ports and a center of a corresponding at least one outlet port;
    wherein the line is arranged at a non-zero angle to an axis of rotation of the crankshaft;
    wherein the line is at a non-right angle to the axis of rotation of the crankshaft;
    wherein the cylinder head is secured by six fasteners; and
    wherein the injection port is arranged radially outward of the center of each of the inlet ports.

2. The internal combustion engine of claim 1, wherein the inlet runner bifurcates into a first section and a second section, the two sections each being connected to different inlet ports.

3. The internal combustion engine of claim 2, wherein at least one of the first and second sections of the inlet runner enters the corresponding inlet port at an angle greater than 32° with respect to a plane transverse an axis of the cylinder.

4. The internal combustion engine of claim 2, wherein the first and second sections of the inlet runner have non-equal lengths.

5. The internal combustion engine of claim 1, wherein the cylinder head is substantially planar and substantially normal an axis of the piston.

6. The internal combustion engine of claim 1, wherein the non-right angle between the line and the axis of rotation of the crankshaft is in the range of 45° to 55°.

7. The internal combustion engine of claim 1, wherein at least one of the inlet and outlet valves is located, when closed, in the corresponding port in a recessed position from an inner surface of the cylinder head.

8. The internal combustion engine of claim 1, wherein at least one of the inlet ports has a larger diameter than the diameter of the at least one outlet port.

9. The internal combustion engine of claim 1, wherein the cylinder head comprises two outlet ports and the spark plug is located in a region intermediate the inlet and outlet ports.

10. The internal combustion engine of claim 9, wherein the fuel injector is arranged so that the injection point is located in a region intermediate the inlet and outlet ports.

11. The internal combustion engine of claim 1, further comprising at least two cylinders and wherein the cylinder head of each cylinder assembly is formed of a single piece of material.

12. The internal combustion engine of claim 1, further comprising a valve train comprising:
    a cam shaft arranged in an engine block; and
    a series of pushrods and rockers arranged to open and close the inlet and outlet valves.

13. The internal combustion engine of claim 1, wherein the fuel injector is located below the inlet runner.

14. The internal combustion engine of claim 1, wherein the injection port is arranged intermediate the two inlet ports.

* * * * *